United States Patent
Numata (12) 
(10) Patent No.: US 10,834,302 B2
(45) Date of Patent: Nov. 10, 2020

(54) IMAGE CAPTURING APPARATUS, METHOD OF CONTROLLING SAME, AND STORAGE MEDIUM

(71) Applicant: CANON KABUSHIKI KAISHA, Tokyo (JP)

(72) Inventor: Aihiko Numata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/246,667

(22) Filed: Jan. 14, 2019

(65) Prior Publication Data

US 2019/0222734 A1 Jul. 18, 2019

(30) Foreign Application Priority Data

Jan. 18, 2018 (JP) ................................. 2018-006684

(51) Int. Cl.
| | |
|---|---|
| *H04N 5/238* | (2006.01) |
| *H04N 5/243* | (2006.01) |
| *H04N 5/225* | (2006.01) |
| *H04N 7/18* | (2006.01) |

(52) U.S. Cl.
CPC ........... *H04N 5/2258* (2013.01); *H04N 5/238* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 2006/0171704 A1* | 8/2006 | Bingle | .................... | B60R 11/04 396/419 |
| 2011/0069205 A1* | 3/2011 | Kasai | ...................... | G06T 7/254 348/239 |
| 2015/0341573 A1* | 11/2015 | Matsuo | .................... | H04N 5/33 348/135 |
| 2016/0309110 A1* | 10/2016 | Laroia | .................. | H04N 5/2258 |
| 2019/0057495 A1* | 2/2019 | Shionoya | ............... | H04N 5/232 |

FOREIGN PATENT DOCUMENTS

JP 2007-006285 A 1/2007

\* cited by examiner

*Primary Examiner* — Dave Czekaj
*Assistant Examiner* — Samuel D Fereja
(74) *Attorney, Agent, or Firm* — Cowan, Liebowitz & Latman, P.C.

(57) ABSTRACT

An image capturing apparatus, comprising: a first imaging section having a plurality of imaging sections arranged so that parts of their image capturing ranges overlap; a second imaging section configured to generate a detailed image by capturing a part of an image capturing range of the first imaging section; a combining section configured to generate a wide-angle image by combining images captured by the plurality of imaging sections; a transfer section configured to transfer the wide-angle image; and a control section configured to control a maximum charge accumulation time period that can be set to the plurality of imaging sections in the first imaging section to be greater than a maximum charge accumulation time period that can be set to the second imaging section.

16 Claims, 8 Drawing Sheets

IMAGE CAPTURING APPARATUS, METHOD OF CONTROLLING SAME, AND STORAGE MEDIUM

BACKGROUND OF THE INVENTION

Field of the Invention

The present invention relates to an image capturing apparatus that can be used for the purpose of monitoring or the like.

Description of the Related Art

In recent years, an image capturing apparatus that has a plurality of cameras and realizes new functionality by the plurality of cameras cooperating has been proposed (for example, Japanese Patent Laid-Open No. 2007-6285).

In the image capturing apparatus disclosed by Japanese Patent Laid-Open No. 2007-6285, each of a plurality of cameras has a solid-state image sensor, and respectively independent exposure conditions are set while a signal is read at the same frame rate from each solid-state image sensor. However, in case where a plurality of cameras having different sensitivities are used, the following problem occurs.

Typically, an upper limit of a charge accumulation time period of a solid-state image sensor is decided by a signal readout frequency at which a pixel signal for one image is read from the solid-state image sensor. Accordingly, in a case where a common signal readout frequency is used among a plurality of cameras having different sensitivities, a degree of freedom of exposure level control decreases. As a result, the quality of an image captured by a camera having relatively low sensitivity decreases, particularly in an environment where there is low light intensity.

SUMMARY OF THE INVENTION

The present invention is made in light of the foregoing problem, and, in an image capturing apparatus having a plurality of cameras with different sensitivities, improves quality of an image captured by a camera having relatively low sensitivity.

According to a first aspect of the present invention, there is provided an image capturing apparatus, comprising: a first image capturing device having a plurality of imaging sections arranged so that parts of their image capturing ranges overlap, and each imaging section having a solid-state image sensor; a second image capturing device having a solid-state image sensor and configured to generate a detailed image by capturing a part of an image capturing range of the first image capturing device; and at least one processor or circuit configured to function as the following units: a combining process unit configured to generate a wide-angle image by combining images captured by the plurality of imaging sections; a transfer unit configured to transfer the wide-angle image combined by the combining process unit to an external device; and a control unit configured to control a maximum charge accumulation time period that can be set to the solid-state image sensors of the plurality of imaging sections in the first image capturing device to be greater than a maximum charge accumulation time period that can be set to the solid-state image sensor in the second image capturing device.

According to a second aspect of the present invention, there is provided a method of controlling an image capturing apparatus provided with a first image capturing device having a plurality of imaging sections arranged so that parts of their image capturing ranges overlap, and each imaging section having a solid-state image sensor, and a second image capturing device having a solid-state image sensor and configured to generate a detailed image by capturing a part of an image capturing range of the first image capturing device, the method comprising: generating a wide-angle image by combining images captured by the plurality of imaging sections; transferring the wide-angle image combined by the combining to an external device; and controlling a maximum charge accumulation time period that can be set to the solid-state image sensors of the plurality of imaging sections in the first image capturing device to be greater than a maximum charge accumulation time period that can be set to the solid-state image sensor in the second image capturing device.

Further features of the present invention will become apparent from the following description of exemplary embodiments with reference to the attached drawings.

DESCRIPTION OF THE EMBODIMENTS

Hereinafter, referring to the attached drawings, embodiments of the present invention will be described in detail. Note that the same reference numerals are added to portions having the same functions in the view of the embodiments, and repeated description is omitted.

First Embodiment

Figure 1:
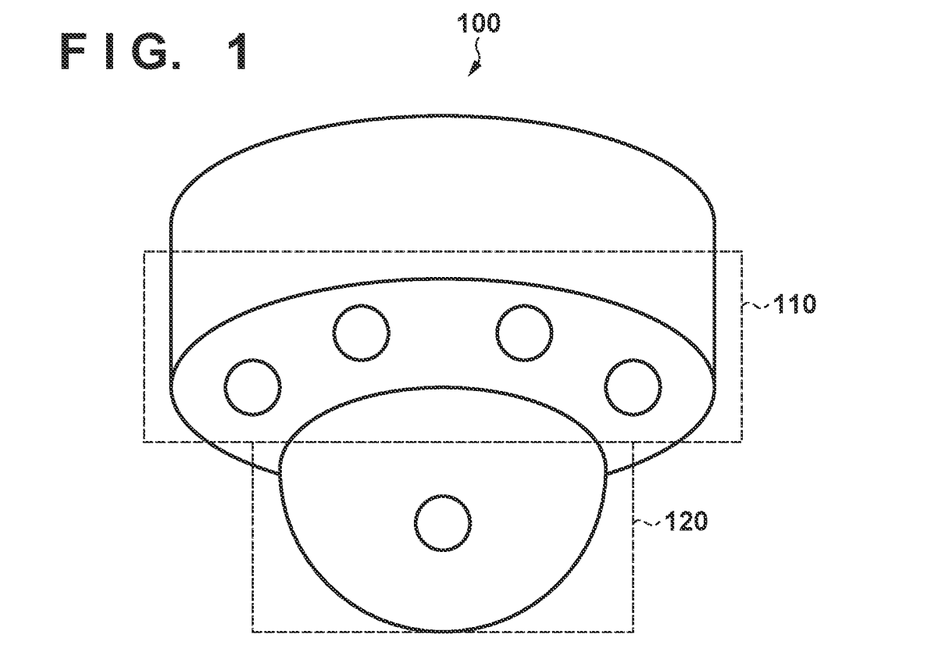
FIG. 1 is a view for illustrating an image capturing apparatus of a first embodiment of the present invention.
Figure 2:
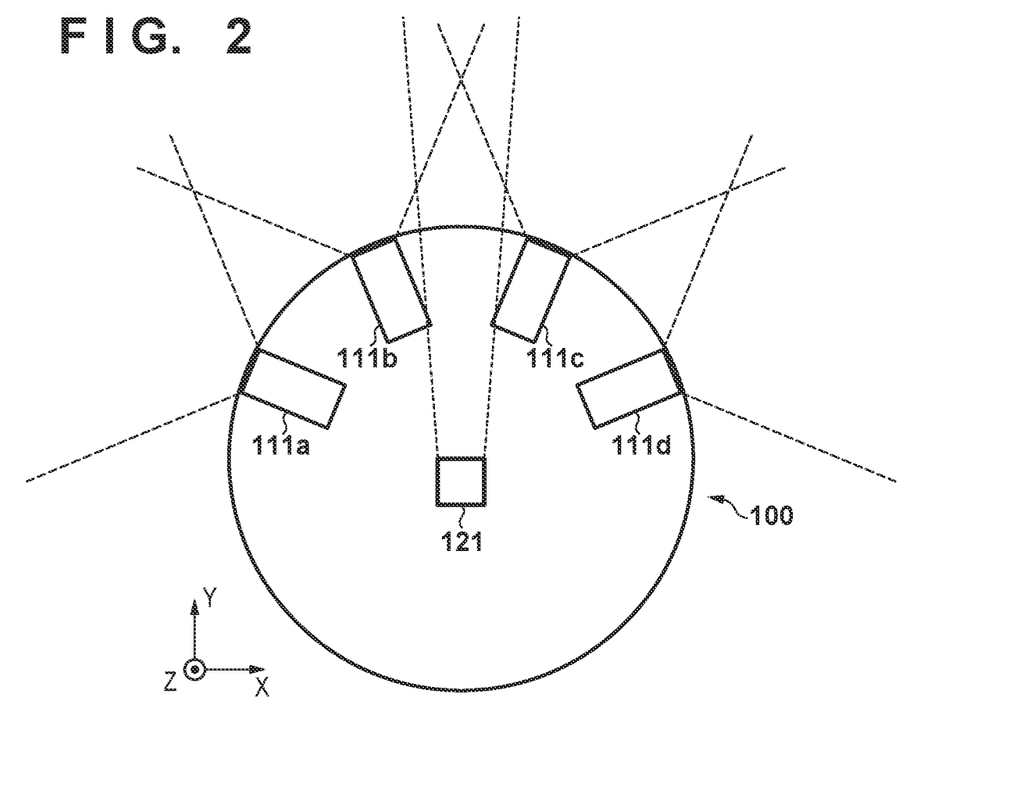
FIG. 2 is a view for illustrating a monitoring system of a first embodiment of the present invention.
Figure 3:
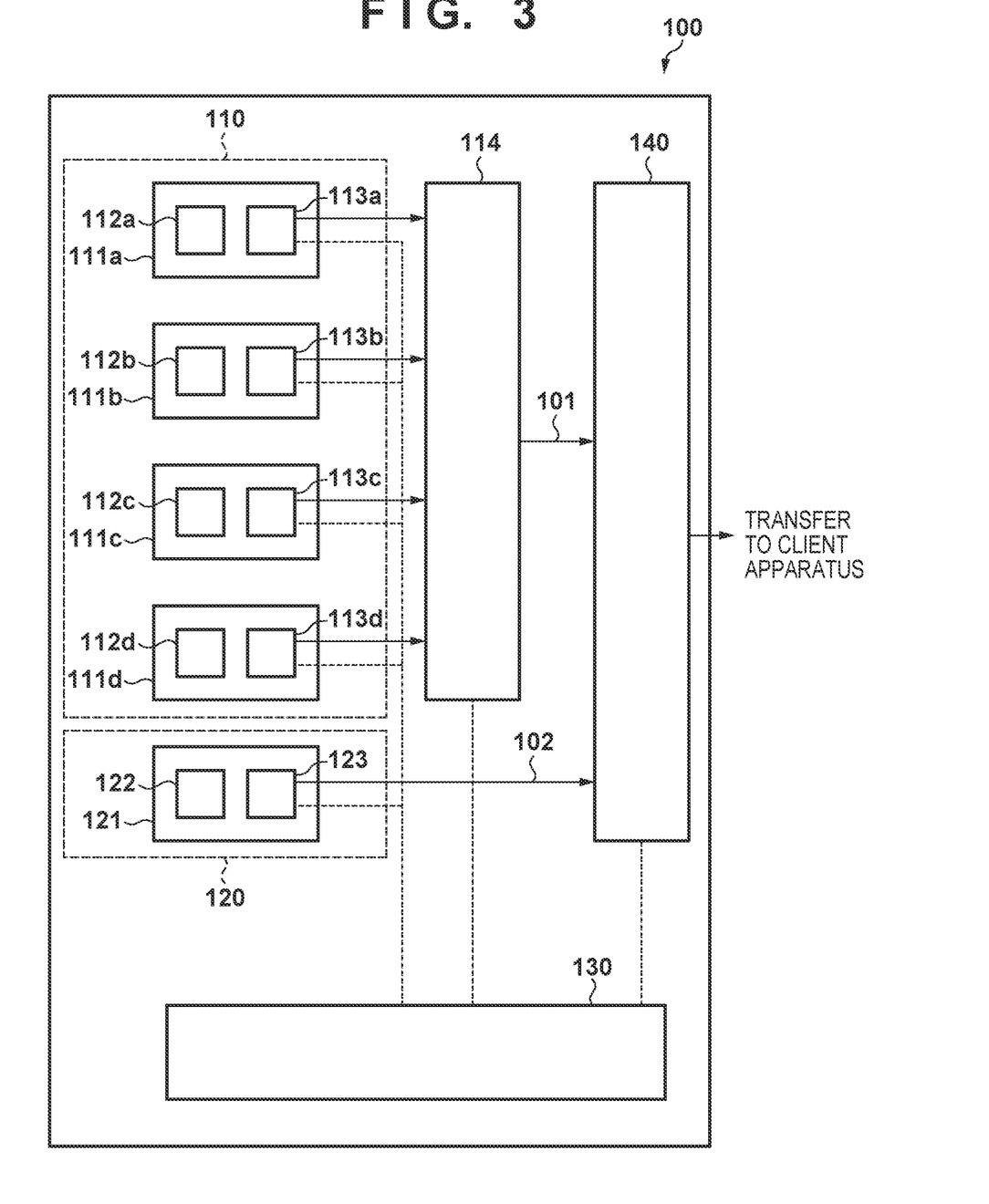
FIG. 3 is a view for illustrating a block configuration of an image capturing apparatus of a first embodiment of the present invention.

FIG. 1 through FIG. 3 are views for illustrating an image capturing apparatus of a first embodiment of the present invention, and a monitoring system that uses this image capturing apparatus. FIG. 1 is a perspective view that views the image capturing apparatus 100 from a diagonal perspective, FIG. 2 is an arrangement view that views the image capturing apparatus 100 from above (a +Z side), and FIG. 3 is a functional block diagram of the internals of the image capturing apparatus 100.

In FIG. 1 through FIG. 3, the image capturing apparatus 100 has a first imaging section 110 for obtaining a wide-angle image 101, and a second imaging section 120 for capturing a part of an image capturing range of the first imaging section 110 to obtain a detailed image 102. The image capturing apparatus 100 is also provided with a control section 130 for controlling operation of the first imaging section 110 and the second imaging section 120, and a transfer section 140 for transferring the wide-angle image 101 and the detailed image 102 to an external unit.

The transfer section 140 is connected to an external client apparatus via a wired or wireless network, for example, and, in accordance with switching by a switch, transfers the wide-angle image 101 and the detailed image 102 in order to the same network.

The external client apparatus transmits a command for controlling the image capturing apparatus 100 to the transfer section 140 via the network, and, upon receiving this command, the image capturing apparatus 100 transmits a response to the command to the client apparatus. The client apparatus is an external device such as a PC (a personal computer), for example, and the network is configured by a wired LAN, a wireless LAN, or the like. In addition, configuration may be taken such that power is supplied to the image capturing apparatus 100 via the network.

The first imaging section 110 has a plurality of imaging sections 111a, 111b, 111c, and 111d arranged so that parts of their image capturing ranges overlap, and the first imaging section 110 generates the wide-angle image 101 by combining images obtained by the imaging sections 111a through 111d in a combining section 114. Specifically, by applying a so-called pattern matching technique for obtaining a correlation coefficient while shifting overlapping portions of the images obtained by a plurality of adjacent imaging sections (for example, 111a and 111b), alignment between a plurality of images is performed, and the wide-angle image 101 is generated.

The plurality of imaging sections 111a through 111d respectively have image-forming optical systems 112a through 112d and solid-state image sensors 113a through 113d. Images are obtained by causing a subject image to be formed on the solid-state image sensors 113a through 113d via the image-forming optical systems 112a through 112d.

Driving and signal readout for each of the solid-state image sensors 113a through 113d is controlled by the control section 130. By controlling a charge accumulation time period with respect to pixels of the solid-state image sensors 113a through 113d, an exposure level of each of the imaging sections 111a through 111d in the first imaging section 110 is controlled.

The second imaging section 120 is configured by a single imaging section 121, and has an image-forming optical system 122 and a solid-state image sensor 123 which has a higher sensitivity than that of the solid-state image sensors 113a through 113d. Here, a high sensitivity means that a signal-to-noise ratio of an image is high when capturing is performed in the same environment. Similarly to the first imaging section 110, driving and signal readout for the solid-state image sensor 123 is controlled by the control section 130.

With a configuration as described above, in the image capturing apparatus 100 of the present embodiment, a maximum charge accumulation time period that can be set to the solid-state image sensors 113a through 113d in the first imaging section 110 is made longer than a maximum charge accumulation time period that can be set to the solid-state image sensor 123 in the second imaging section 120.

By such a configuration, it is possible to restrict a decrease in quality of the wide-angle image 101 which is generated from images obtained by the first imaging section 110 which has a relatively low sensitivity. Description is made below by giving a comparison with a conventional image capturing apparatus.

DESCRIPTION OF CONVENTIONAL EXAMPLE

Figure 4:
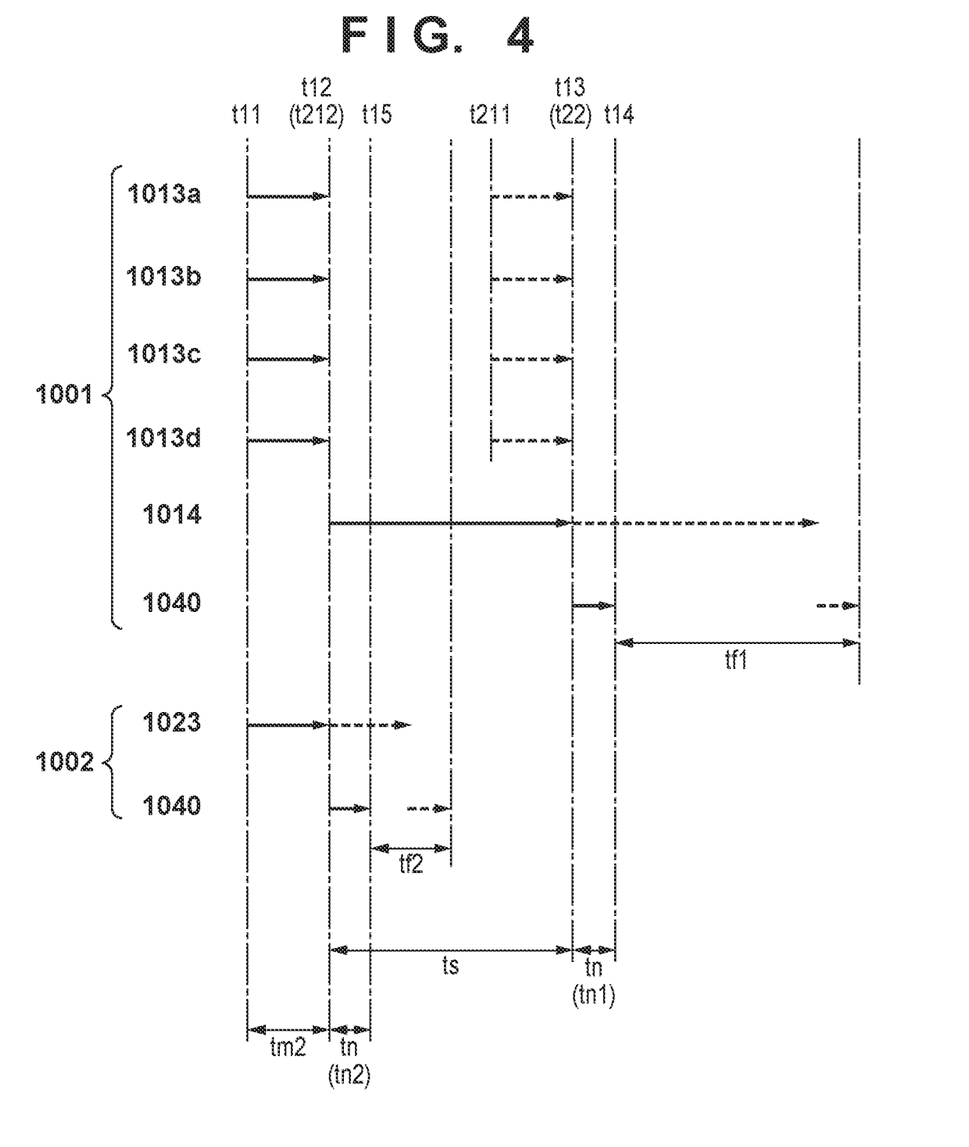
FIG. 4 is a timing chart illustrating a pixel signal readout operation in a conventional image capturing apparatus.

FIG. 4 is a timing chart illustrating pixel signal readout timings in a conventional image capturing apparatus 1000 illustrated for a comparison. The configuration of the conventional image capturing apparatus 1000 differs from the image capturing apparatus 100 of the present embodiment illustrated in FIG. 1 in that the maximum charge accumulation time period that can be set to solid-state image sensors of the plurality of imaging sections in the first imaging section is equal to the maximum charge accumulation time period that can be set to the solid-state image sensor in the second imaging section. Note that a reference numeral starting with 1000 has been added to each section of the conventional image capturing apparatus 1000 to distinguish it from the configuration of the present embodiment. In addition, in FIG. 4, illustration is given for a case where the light intensity is sufficiently low, and the exposure level of the first imaging section and the second imaging section is set to the maximum charge accumulation time period. Solid lines in in the drawing are for a first frame, and dashed lines are for a second frame.

Firstly, description is given for the timing chart for the conventional image capturing apparatus 1000 illustrated in FIG. 4. Solid-state image sensors 1013a through 1013d and a solid-state image sensor 1023 simultaneously start charge accumulation at a time t11, and simultaneously end charge accumulation at a time t12 which is after a maximum charge accumulation time period tm2 has elapsed from the time t11.

Pixel signals read out from the solid-state image sensors 1013a through 1013d are combined in a combining unit 1014, and transferred to a transfer section 1040 as a wide-angle image 1001. Assuming that ts is a time period necessary for a combining process, at a time t13 which when the time period ts has elapsed from the time t12, data for the wide-angle image 1001 arrives at the transfer section 1040. Assuming that tn1 is the amount of time necessary to transfer the data of the wide-angle image 1001 via the network, at a time t14 when the time period tn1 has further elapsed from the time t13, the data transfer for one frame of the wide-angle image 1001 to the client apparatus completes.

Charge accumulation with respect to the solid-state image sensor for the next frame starts so that the time t13 when the combining process of the first frame ends and a time t22 when the combining process for the second frame starts overlap. In other words, the time for the start of charge accumulation for the next frame is t211 illustrated in the view, and the frame rate of the wide-angle image 1001 is the inverse of a time period tf1 illustrated in FIG. 4.

In contrast, a pixel signal read from the solid-state image sensor 1023 is sent unchanged to the transfer section 1040 as a detailed image 1002 without a combining process being performed, and it is transferred to a client apparatus via a network. Here, it is assumed that in the transfer section 1040, the time period tn2 necessary to transfer the detailed image 1002 is made to be equal to the time period tn1 necessary to transfer the wide-angle image, by switching transfer intervals for data of the wide-angle image 1001 and data of the detailed image 1002. Time periods tn1 and tn2 are both referred to as tn below. At a time t15 when the time period tn has elapsed from the time t12, the client apparatus completes obtaining data of the detailed image 1002 for one frame.

Subsequently, charge accumulation with respect to the solid-state image sensor for the next frame starts so that the charge accumulation ending time t12 of the first frame and a charge accumulation start time 212 for the second frame overlap. In other words, the frame rate of the detailed image 1002 is the inverse of the time period tf2 illustrated in FIG. 4.

Figure 5:
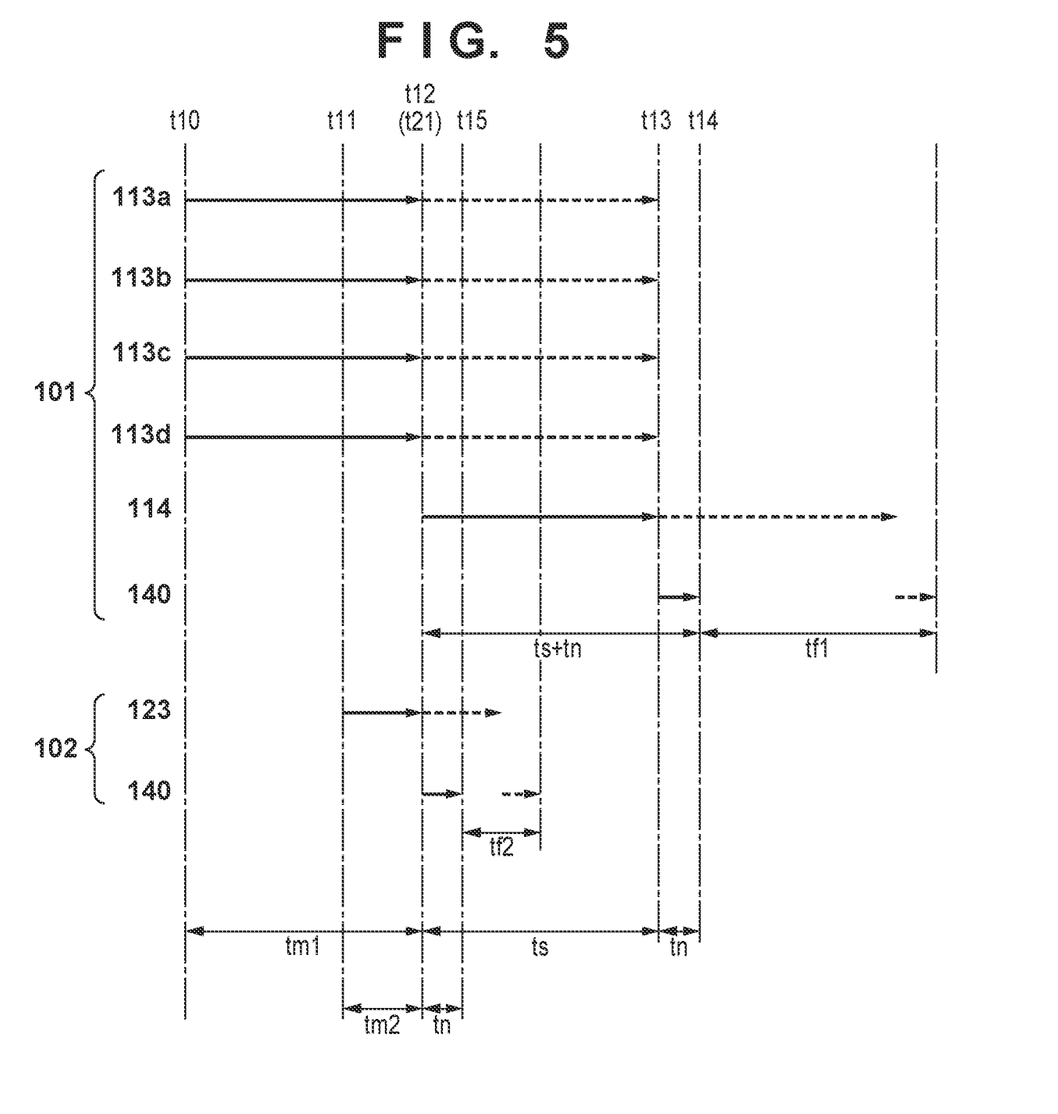
FIG. 5 is a timing chart illustrating a pixel signal readout operation in an image capturing apparatus of the first embodiment.

Next, description is given regarding a timing chart, illustrated in FIG. 5, for pixel signal readout in the image capturing apparatus 100 of the first embodiment of the present invention. Pixel signals read out from the solid-state image sensor 123 are the same as pixel signals read out from the solid-state image sensor 1023 of the conventional image capturing apparatus 1000.

In contrast, a time t10 for starting charge accumulation in the solid-state image sensors 113a through 113d is a time earlier than the time t11 for starting charge accumulation in the solid-state image sensor 123. In other words, the charge accumulation time periods for the solid-state images sensors 113a through 113d is longer than the charge accumulation time period of the solid-state image sensor 123. By such a configuration, it is possible to improve the quality of the wide-angle image 101 which is generated from images obtained by the first imaging section 110 which has a relatively low sensitivity.

Note that, as can be understood by comparing FIG. 4 and FIG. 5, the length of the time period tf1 is equal between the image capturing apparatus 100 of the present embodiment and the conventional image capturing apparatus 1000. In other words, the image capturing apparatus 100 of the present embodiment can improve the quality of a wide-angle image in comparison to the conventional image capturing apparatus 1000, without reducing the frame rate. Further description is given regarding a reason for this.

In the case of the conventional image capturing apparatus 1000 illustrated in FIG. 4, between the time t12 when charge accumulation for the first frame ends until the time t211 when charge accumulation for the second frame starts, the solid-state image sensors are not performing a charge accumulation operation. In contrast, in the image capturing apparatus 100 of the present embodiment, the time t12 when charge accumulation for the first frame ends matches the time t21 when charge accumulation for the second frame starts. In other words, with the image capturing apparatus 100 of the present embodiment, by performing charge accumulation in a time period where charge accumulation to a solid-state image sensor is not being performed in the conventional image capturing apparatus 1000, the maximum charge accumulation time period is enlarged without decreasing the frame rate.

An upper limit of the charge accumulation time period tm1 for lengthening the charge accumulation time period without reducing the frame rate is the time period is necessary for the combining process in the combining section 114. This is because, when the charge accumulation time period tm1 is set longer than the time period ts, a "waiting time period" during which the combining process is not performed will occur in the combining section. In other words, it is desirable that the charge accumulation time period tm1 is less than or equal to a combining process time period ts (less than or equal to the time period corresponding to the combining process). In particular, a case where the time period tm1 is made equal to the time period ts is desirable because no "waiting time period" will occur in the solid-state image sensors 113a through 113d or the combining section 114.

Figure 6:
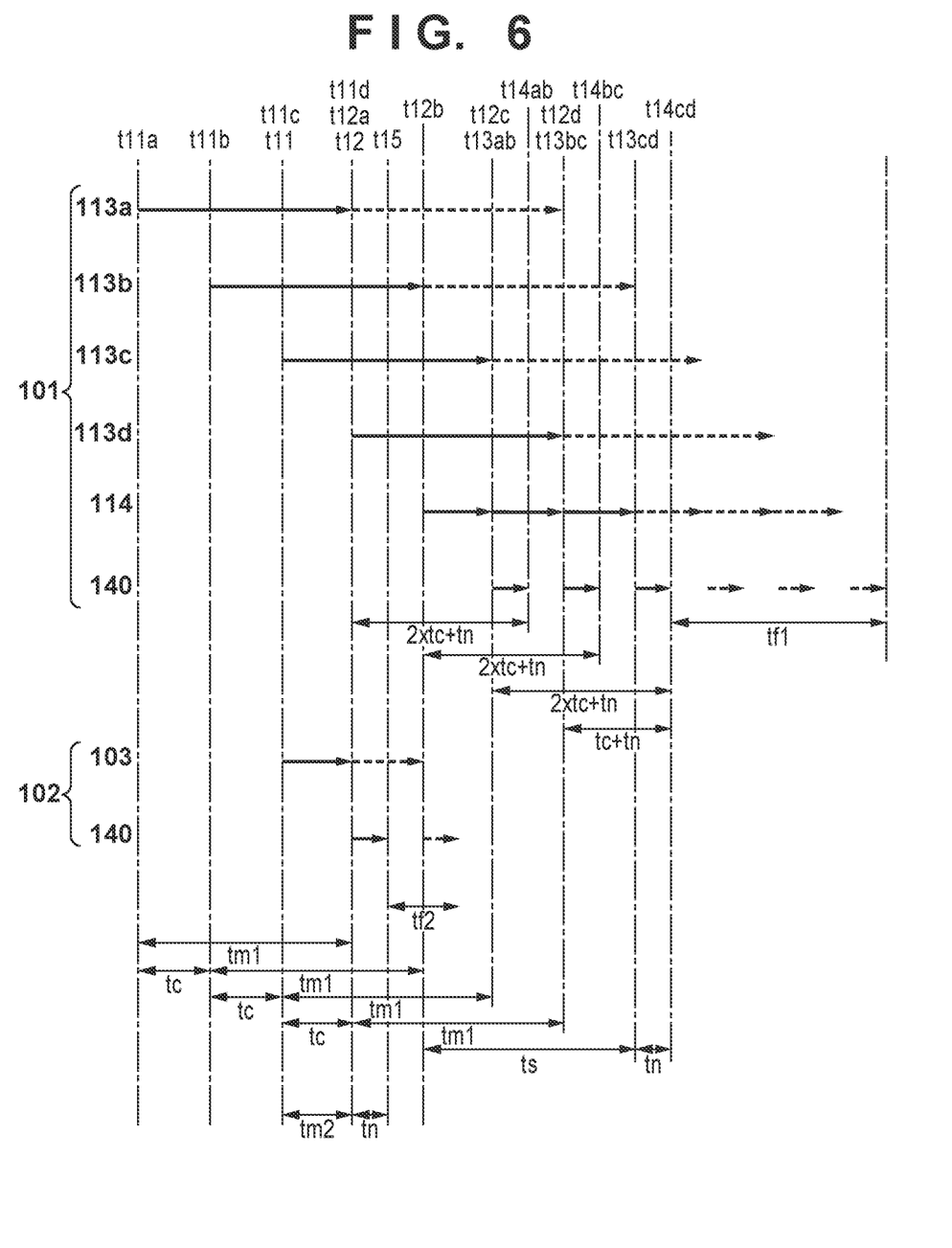
FIG. 6 is a timing chart illustrating a variation of a pixel signal readout operation in an image capturing apparatus of the first embodiment.

A case where the timings of charge accumulation for the solid-state image sensors 113a through 113d match is illustrated in FIG. 5, but timings for charge accumulation may be different among the solid-state image sensors 113a through 113d. FIG. 6 illustrates a concrete example. It is desirable that a delay time from when respective pixel signals by the imaging sections 111a through 111d of the first imaging section 110 are obtained until an image is transferred to client apparatus is shortened, by driving the solid-state image sensors as in the timing chart illustrated in FIG. 6. Hereinafter, this will be described in detail.

Generating the wide-angle image 101 from the image capturing apparatus 100 illustrated in FIG. 2 and FIG. 3 requires three combining processes: combining between the imaging sections 111a and 111b, combining between the imaging sections 111b and 111c, and combining between the imaging sections 111c and 111d. In other words, ts illustrated in FIG. 5 is a time period three times a time period tc necessary for a respective combining process.

In signal processing illustrated in FIG. 5, the combining processes are performed after data for all images obtained by the imaging sections 111a through 111d is transferred to the combining section 114. As a result, a delay time of ts+tn occurs between the charge accumulation ending time t12 for the imaging sections 111a through 111d to the transfer ending time t14 in the transfer section 140.

In contrast, in the signal processing illustrated in FIG. 6, timings for charge accumulation of the solid-state image sensors 113a through 113d (start times t11a through t11d, and ending times t12a through t12d) are shifted by a time period tc. By performing three combining processes in the combining section 114, the delay time is shortened.

Specifically, from a time t12b when charge accumulation for the solid-state image sensors 113a and 113b ends, a combining process for an image obtained by the imaging section 111a and an image obtained by the imaging section 111b is performed. Similarly, a combining process between the imaging sections 111b and 111c is performed from a time t12c when charge accumulation in the solid-state image sensors 113b and 113c ends, and a combining process between the imaging sections 111c and 111d is performed from a time t12d when charge accumulation in the solid-state image sensors 113c and 113d ends.

As a result, the delay times from the charge accumulation ending times t12a through t12c for the solid-state image sensors 113a through 113c to the respective transfer ending times t14ab, t14bc, and t14cd in the transfer section 140 can be shortened to 2×tc+tn. Similarly, the delay time from the charge accumulation ending time t12d in the solid-state image sensor 113d to the transfer ending time t14cd at the transfer section 140 can be shortened to tc+tn. In other words, it is possible to shorten the delay time from when pixel signals are obtained by each of the imaging sections 111a through 111d of the first imaging section 110 until images are transferred to the client apparatus.

In this way, in the image capturing apparatus 100 of the present embodiment, it is possible to, in comparison to the conventional image capturing apparatus 1000, improve the quality of the wide-angle image 101 which is generated in accordance with an image captured by the first imaging section 110, which has a lower sensitivity than that of the second imaging section 120. In other words, in a case of using the image capturing apparatus of the present embodiment, it is possible to use solid-state image sensors having lower sensitivity than those of the conventional image capturing apparatus 1000, for the first imaging section 110 which obtains the wide-angle image 101. As a result, the following merits arise for the image capturing apparatus. Description is given in order.

(1) It is Possible to Use a Low-Cost Solid-State Image Sensor

The first is the merit of reducing the cost. Typically, to improve the sensitivities of the solid-state image sensor, it is necessary to optimize a pixel structure or a circuit configuration, or use more precise process rules. As a result, the manufacturing cost of the solid-state image sensor increases, or the yield decreases, and the overall cost of the image capturing apparatus increases. Because it is possible to obtain a high-quality image even if a low-sensitivity solid-state image sensor is used, the image capturing apparatus 100 of the present embodiment has the merit that it is possible to reduce the cost with respect to that of the conventional image capturing apparatus 1000.

(2) It is Possible to Use a Smaller Solid-State Image Sensor

The second merit is that it is possible to miniaturize the apparatus. Typically, the larger a pixel in the solid-state image sensor the higher the sensitivity of the solid-state image sensor. Because it is possible to obtain a high-quality image even if a low-sensitivity solid-state image sensor is used, the image capturing apparatus 100 of the present embodiment can use an image capture element having smaller pixels, in other words a smaller solid-state image sensor, than that for the conventional image capturing apparatus 1000. There is the merit that it is possible to miniaturize the image capturing apparatus 100 because it is possible to miniaturize the image-forming optical system if it is possible to use a small-scale solid-state image sensor. The size of the image capturing apparatus 100 is mainly decided by the size of the first imaging section 110 which is configured from a plurality of imaging sections. Accordingly, rather than miniaturizing the second imaging section 120, miniaturizing the plurality of imaging sections of the first imaging section 110 makes it more possible to miniaturize the image capturing apparatus as a whole.

(3) It is Possible to Use a Solid-State Image Sensor with a Larger Number of Pixels The third merit is that it is possible to improve the resolution of an image. In a case where the size of a solid-state image sensor is fixed, when the pixel size is increased in order to save the sensitive of the solid-state image sensor, the number of pixels of the solid-state image sensor decreases. Because it is possible to obtain a high-quality image even if a low-sensitivity solid-state image sensor is used, the image capturing apparatus 100 of the present embodiment can use a solid-state image sensor having a greater number of pixels than those for the conventional image capturing apparatus 1000. As a result, there is the merit that it is possible to improve the resolution of the wide-angle image 101. In particular, because the wide-angle image 101 captures a wider range than the detailed image 102, it is effective to improve the resolution of the wide-angle image 101 rather than the resolution of the detailed image 102.

(4) Reduction of Motion Blur

The fourth merit is that it is possible to reduce the influence of motion blur. Typically, motion blur is likely to occur the longer the charge accumulation time period with respect to the solid-state image sensor, or the smaller the image capturing angle.

If the sensitivity of the second imaging section 120 is lower than the sensitivities of the plurality of imaging sections of the first imaging section 110, it is necessary to have the charge accumulation time period of the solid-state image sensor in the second imaging section 120 be longer than the charge accumulation time period of the solid-state image sensor in the plurality of imaging sections of the first imaging section 110. As a result, the charge accumulation time period of the solid-state image sensor for obtaining the detailed image, which has a relatively small image capturing range, lengthens, and it becomes more likely for motion blur to occur in the detailed image.

In contrast to this, if the sensitivities of the plurality of imaging sections of the first imaging section 110 are lower than the sensitivity of the second imaging section 120 as in the image capturing apparatus 100 of the present embodiment, the charge accumulation time period of the solid-state image sensors of the first imaging section 110 may be longer than the charge accumulation time period of the solid-state image sensor of the second imaging section 120. As a result, it is possible to have the charge accumulation time period of the solid-state image sensor 123, for obtaining the detailed image 102 and for which the image capturing range is relatively small and motion blur is likely to occur, remain short. In contrast, even if the charge accumulation time period with respect to the solid-state image sensor of the first imaging section 110 is lengthened, because the image capturing range is relatively wide for the wide-angle image 101, it is less likely for motion blur to be noticed.

As described above, it is not the case that the image capturing apparatus 100 of the present embodiment controls the respective pixel signal levels obtained by each of the plurality of imaging sections which have different sensitivities by simply controlling the accumulation time period of each solid-state image sensor. In a configuration where the sensitivities of the plurality of imaging sections of the first imaging section which have relatively large angles of view and generate an image by combining is lower than the sensitivity of the second imaging section, the charge accumulation time period of the solid-state image sensor of the first imaging section is set longer than the charge accumulation time period of the second imaging section. By this configuration, the various effects described above are achieved.

Note that a case where the first imaging section 110 is configured from four imaging sections 110a through 110d was illustrated in FIG. 2 and FIG. 3, but it is not necessary for the first imaging section 110 to be configured from four imaging sections. For example, the first imaging section may be configured from two or three imaging sections, and the first imaging section may be configured from five or more imaging sections. In addition, the image capturing range of the first imaging section does not need to be the range illustrated by FIG. 2, and the entire circumference of 360 degrees, for example, may be the image capturing range.

In addition, a case of using the same transfer section 140 and switching the wide-angle image 101 and the detailed image 102 by a switch to thereby transfer in order in the same network is illustrated in FIG. 3, but such a configuration is not necessary. However, delivery via the same network is desirable in order to make it easier to grasp an association relationship between the wide-angle image 101 and the detailed image 102.

In addition, FIG. 3 illustrates an example where the image capturing apparatus 100 is provided with the transfer section 140, which transfers images to a client apparatus side, and operates by commands from client apparatus side. However, the image capturing apparatus 100 may have any of a memory for saving image data, a viewer for displaying an image, and an interface unit for accepting a user command. In addition, it may have a combination of these.

In addition, description is given above of an example of controlling the charge accumulation time period for a pixel of the solid-state image sensors 113a through 113d as a method for controlling the exposure levels of the plurality of imaging sections 111a through 111d, but this method does not necessarily need to be used. For example, the exposure level may be controlled by controlling a signal amplification coefficient (gain) in the solid-state image sensors 113a through 113d. Controlling the signal amplification coefficient before an AD conversion (an analog gain) is desirable if the solid-state image sensors 113a through 113d have an AD conversion function internally. In addition, the exposure levels of the plurality of imaging sections 111a through 111d may be controlled by the image-forming optical systems 112a through 112d in the plurality of imaging sections 111a through 111d having aperture mechanisms and the control section 130 controlling the aperture mechanisms. Furthermore, the image-forming optical systems 112a through 112d have light-absorption filters and insertion/removal mechanisms therefor, and an exposure level may be controlled by inserting/removing a light-absorption filter. Alternatively, the light-absorption filter is a variable transmittance filter configured from a liquid crystal or the like, and an exposure level may be controlled by controlling a voltage applied to the variable transmittance filter. In addition, a plurality of the foregoing methods may be combined.

Second Embodiment

The image capturing apparatus 100 of the first embodiment decides the upper limit for the charge accumulation time period tm1 in accordance with the time period is necessary for a combining process in the combining section 114. In contrast to this, an image capturing apparatus 200 of the second embodiment decides the upper limit of the charge accumulation time period tm1 in accordance with a transfer time period for a transfer section 240, as the resolution of a wide-angle image 201 is higher than that of a detailed image 202. Note that, because the apparent configuration of an image capturing apparatus of the second embodiment is similar to the configuration of the image capturing apparatus of the first embodiment illustrated in FIG. 3, although not specifically illustrated graphically, each block of the second embodiment is distinguished from the first embodiment by stating a reference numeral starting with 200.

The transfer section 240 of the image capturing apparatus 200 of the second embodiment is configured to transfer the wide-angle image 201 and the detailed image 202 by switching at a certain ratio. In other words, as illustrated by FIG. 7 and FIG. 8, a time period tn1 necessary to transfer the wide-angle image 201, which has a high resolution and a large amount of data that configures the image, is longer than a time period tn2 necessary to transfer the detailed image 202 which has a lower resolution and a smaller amount of data that configures the image.

Figure 7:
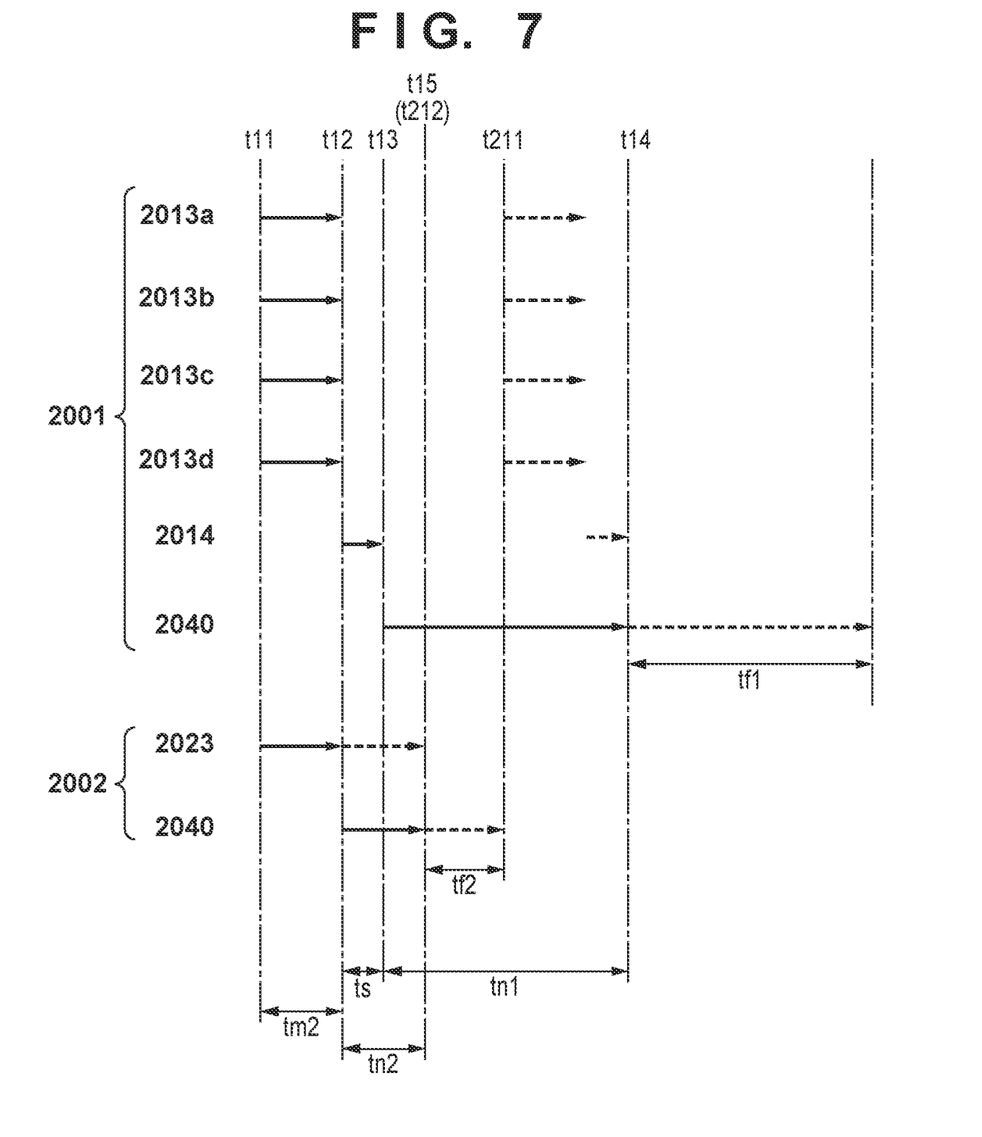
FIG. 7 is a timing chart illustrating a pixel signal readout operation in a conventional image capturing apparatus.
Figure 8:
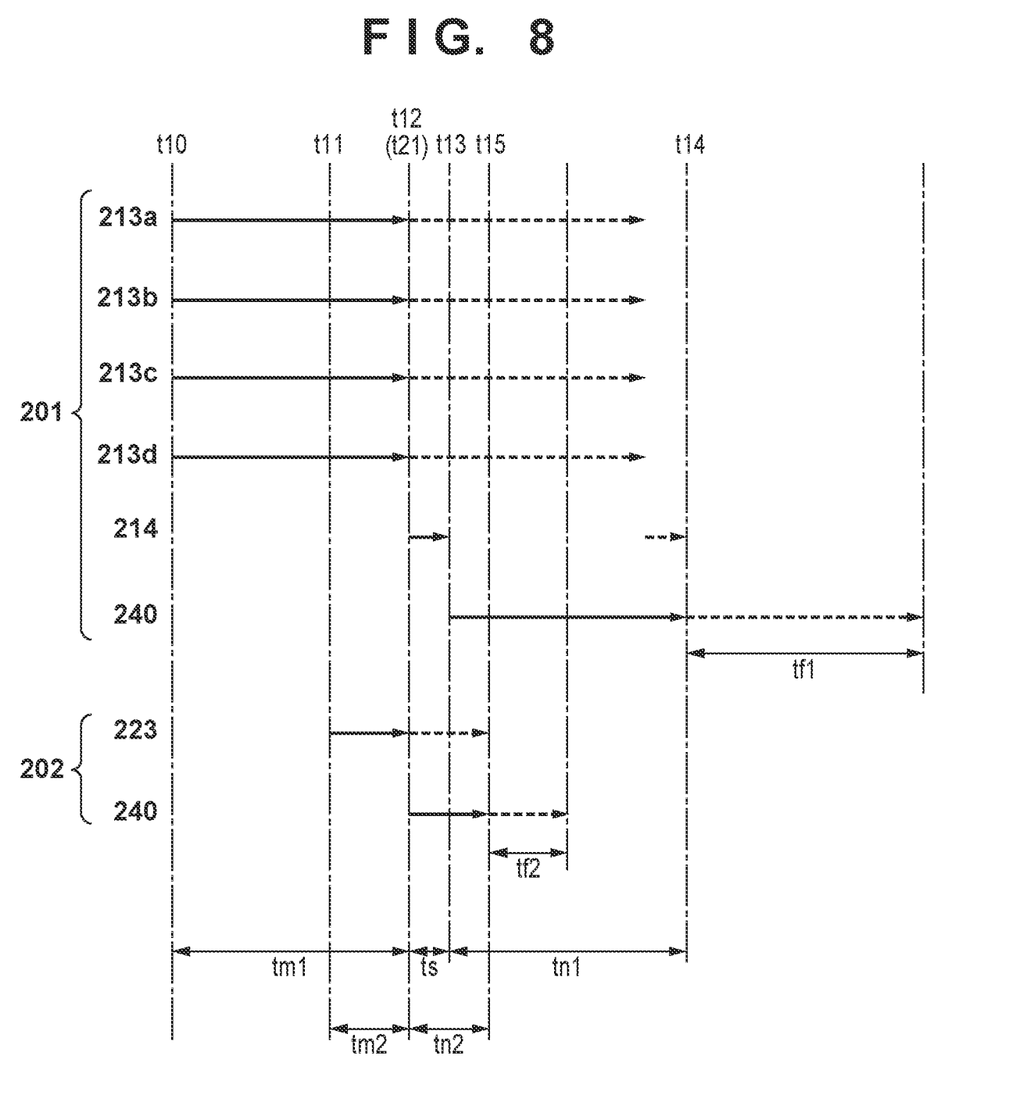
FIG. 8 is a timing chart illustrating a pixel signal readout operation in an image capturing apparatus of the second embodiment.

FIG. 7 is a pixel signal readout timing chart in a conventional image capturing apparatus 2000 illustrated for a comparison with the image capturing apparatus 200 of the second embodiment. Because the apparent configuration of the conventional image capturing apparatus 2000 is similar to the configuration of the image capturing apparatus of the second embodiment, so no particular illustration is given, but each block of the conventional image capturing apparatus 2000 is distinguished from those of the second embodiment by having a reference numeral starting from 2000.

The configuration of the conventional image capturing apparatus 2000 differs in respect to that of the image capturing apparatus 200 in that the maximum charge accumulation time period that can be set to a solid-state image sensor of the first imaging section is equal to the maximum charge accumulation time period that can be set to a solid-state image sensor of the second imaging section. Note that, in FIG. 7, illustration is given for a case where the light intensity is sufficiently low, and the exposure level of the first imaging section and the second imaging section are set to the maximum charge accumulation time period. Solid lines in in the drawing are for a first frame, and dashed lines are for a second frame.

For the timing chart illustrated in FIG. 7, the time period is necessary for a combining process, the time period tn1 necessary to transfer data of a wide-angle image 2001 via the network, and the time period tn2 necessary to transfer data of a detailed image 2002 via the network differ from those in the timing chart illustrated in FIG. 4.

In the image capturing apparatus 200 of the second embodiment, as illustrated by FIG. 8, the time t10 when solid-state image sensors 213a through 213d of a first imaging section 210 start charge accumulation is earlier than the time t11 when a solid-state image sensor 223 of the second imaging section 220 starts charge accumulation. In other words, the charge accumulation time periods for the solid-state images sensors 213a through 213d is longer than the charge accumulation time period of the solid-state image sensor 223. By such a configuration, it is possible to improve the quality of a combined image which is generated from images obtained by the first imaging section which has a relatively low sensitivity.

In the case of the conventional image capturing apparatus 2000 illustrated in FIG. 7, between the time t12 when charge accumulation for the first frame ends until the time t211 when charge accumulation for the second frame starts, the solid-state image sensors are not performing a charge accumulation operation. In contrast, in the image capturing apparatus 200 of the present embodiment, the time t12 when charge accumulation for the first frame ends matches the time t21 when charge accumulation for the second frame starts. In other words, the image capturing apparatus 200 illustrated in the second embodiment can also increase the maximum charge accumulation time period without reducing the frame rate, similarly to the image capturing apparatus 100 illustrated in the first embodiment.

In the case of the image capturing apparatus 200 illustrated in the second embodiment, an upper limit of the charge accumulation time period tm1 for lengthening the charge accumulation time period without reducing the frame rate is the time period tn1 necessary to transfer the wide-angle image 201, as illustrated in FIG. 8. This is because, when the charge accumulation time period tm1 is set longer than the time period tn1, a "waiting time period" during which the transfer process is not performed will occur in the transfer section 240. In other words, it is desirable that the charge accumulation time period tm1 is less than or equal to a wide-angle image transfer time period tn1 (less than or equal to the time period corresponding to the transfer process). In particular, a case where the time period tm1 is made equal to the time period tn1 is desirable because no "waiting time period" will occur in the solid-state image sensors 213a through 213d or the transfer section 214.

In other words, the upper limit of the charge accumulation time period tm1 is decided by the longer of the combining process time period ts in the combining section and the wide-angle image transfer time period tn1 in the transfer section. In the image capturing apparatus 100 of the first embodiment, because the time period ts is longer than the time period tn1 as illustrated by FIG. 5, the upper limit of the time period tm1 is decided by the time period ts. In contrast, in the image capturing apparatus 200 of the second embodiment, because the time period tn1 is longer than the time period ts as illustrated by FIG. 7, the upper limit of the time period tm1 is decided by the time period tn1.

Note that the wide-angle image transfer time period tn1 depends on an amount of data that configures the wide-angle image 201. The amount of data that configures an image varies in accordance with a motion amount of a photographic subject and the brightness of the image, in addition to the resolution of the image. Accordingly, information obtained from the wide-angle image 201 may be used to cause the upper limit of the charge accumulation time period tm1 to vary for each frame. For example, configuration may be taken to obtain brightness information from the wide-angle image 201, predict the wide-angle image transfer time period tn1, and use the predicted time period tn1 for transfer of a wide-angle image to cause the upper limit of the charge accumulation time period tm1 to vary for each frame. Alternatively, configuration may be taken to obtain motion information of a photographic subject from differences of a plurality of frames of the wide-angle image 201, predict the wide-angle image transfer time period tn1, and use the predicted wide-angle image transfer time period tn1 to cause the upper limit of the charge accumulation time period tm1 to vary for each frame.

Third Embodiment

Because the apparent configuration of an image capturing apparatus 300 of the third embodiment is similar to the configuration of the image capturing apparatus of the first embodiment illustrated in FIG. 3, although illustration as a figure is not particularly made, each block of the third embodiment is distinguished from the first embodiment by stating a reference numeral starting with 300. In the image capturing apparatus 300, the configuration of the second imaging section differs from that in the image capturing apparatus 100 of the first embodiment. Specifically, an image-forming optical system 322 of a second imaging section 320 of the image capturing apparatus 300 has an aperture control mechanism, and the second imaging section 320 controls an exposure level by controlling the aperture in addition to the charge accumulation time period with respect to a solid-state image sensor 323. With such a configuration, it is possible to miniaturize the image capturing apparatus 300, and reduce the influence of flicker due to environmental light.

Typically, the shorter the charge accumulation time period of a solid-state image sensor, the more likely for flicker due to environmental light to occur. Accordingly, to restrict flicker, it is desirable to lengthen the charge accumulation time period for the solid-state image sensor. In the image capturing apparatus 300 of the third embodiment, because it is possible to lower the exposure level by narrowing the aperture in the second imaging section 320 which has relatively high sensitivity, it is possible to capture by an appropriate exposure level while maintaining a long charge accumulation time period, even in an environment with high light intensity. In other words, capturing at an appropriate exposure level while restricting flicker is possible.

In contrast, a first imaging section 310, which does not have an aperture in an image-forming optical system, has a relatively low sensitivity. As a consequence, a charge accumulation time period to realize an optimal exposure level is longer than that for the second imaging section 320, even in an environment with high light intensity. Accordingly, by only controlling the charge accumulation time period and not controlling an exposure level in accordance with an aperture in the first imaging section 310, it is possible to restrict flicker.

In this way, the image capturing apparatus 300 of the third embodiment has a configuration in which an aperture control mechanism is provided only for the second imaging section 320 which has relatively high sensitivity. As a result, it is possible to miniaturize the image-forming optical systems of the plurality of imaging sections of the first imaging section 310. As described above, the size of the image capturing apparatus 300 is mainly decided by the size of the first imaging section 310 which is configured from a plurality of imaging sections. Accordingly, rather than miniaturizing the second imaging section 320, miniaturizing the plurality of imaging sections of the first imaging section 310 makes it more possible to miniaturize the image capturing apparatus as a whole.

Fourth Embodiment

Figure 9:
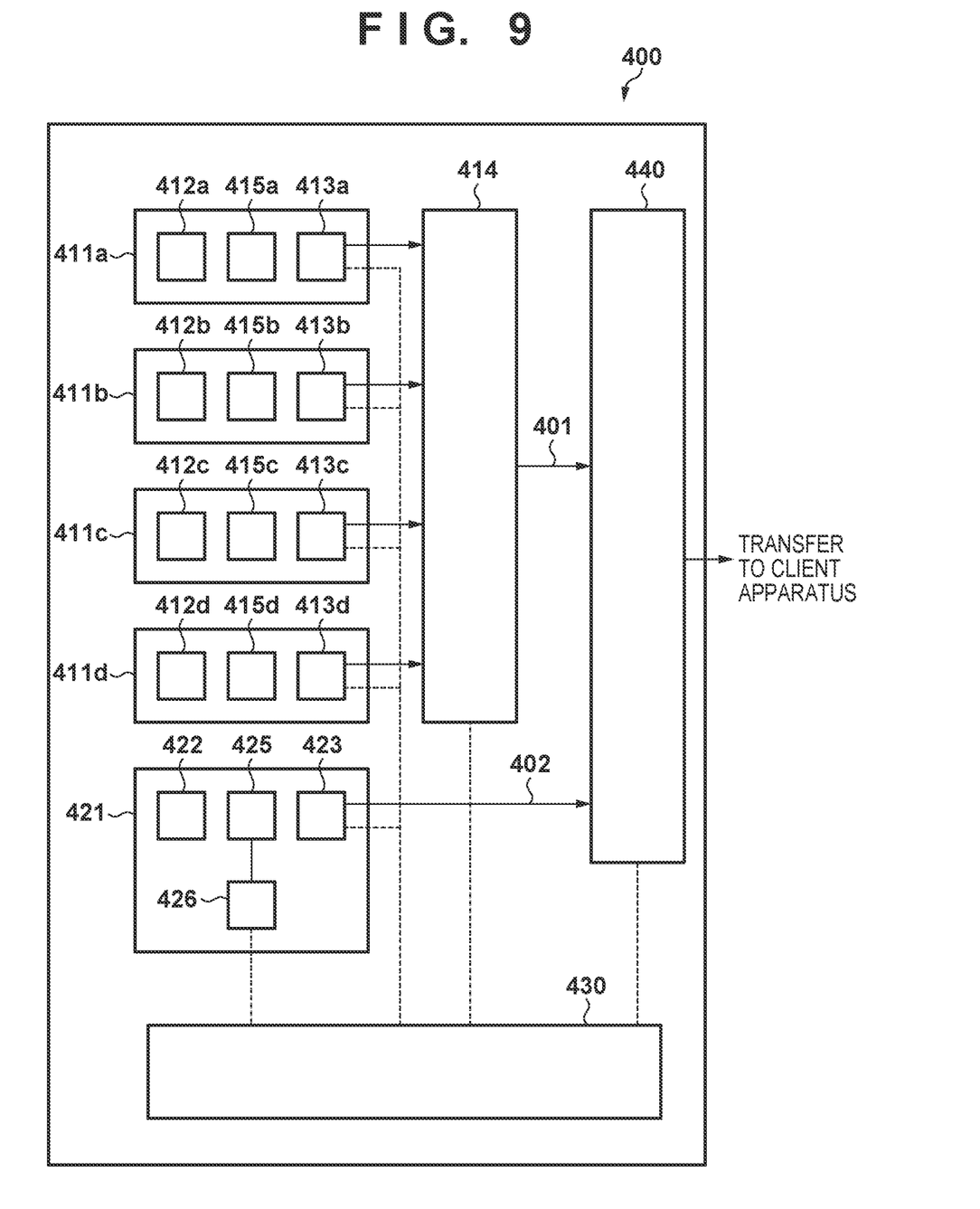
FIG. 9 is a view for illustrating a block configuration of an image capturing apparatus of a fourth embodiment.

In an image capturing apparatus 400 of the fourth embodiment, the configuration of the first imaging section and the second imaging section differ from that in the image capturing apparatus 100 of the first embodiment. FIG. 9 is a functional block diagram of the image capturing apparatus 400 of the fifth embodiment. The apparent configuration of the image capturing apparatus 300 of the fourth embodiment is similar to the configuration of the image capturing apparatus of the first embodiment illustrated in FIG. 3, but is distinguished from that of the first embodiment in that a reference numeral starting from 400 is given to each block of the fourth embodiment.

A plurality of imaging sections 411a through 411d of a first imaging section 410 and a second imaging section 420 in the image capturing apparatus 400 respectively have infrared cut filters 415a through 415d and 425 that can selectively transmit visible light and selectively absorb near-infrared light. Here visible light means light with a wavelength from 380 nm to 750 nm, and near-infrared light means light with a wavelength from 750 nm to 1100 nm.

In addition, the second imaging section 420 has an insertion/removal mechanism 426 which is controlled by a control section 430, and is for inserting/removing an infrared cut filter 425 into or out of a light path. By removing the infrared cut filter 425 from the light path at a time of low light intensity such as nighttime, and capturing both visible light and near-infrared light, the signal-to-noise ratio of the image is improved (hereinafter, night mode). However, in a case where sufficient light intensity can be obtained such as daytime, by inserting the infrared cut filter 425 into the light path and obtaining an image with only visible light, the color reproducibility of the image is improved (hereinafter, day mode). With such a configuration, it is possible to obtain a high-quality image at a time of low light intensity such as nighttime, while miniaturizing the image capturing apparatus 400.

Firstly, description is given regarding the sensitivity of an imaging section. In a case where the image capturing apparatus 400 is used in the day mode, the sensitivity of the second imaging section 420 is lower than the sensitivities of the plurality of imaging sections of the first imaging section 410. Accordingly, in a case of performing capturing in the day mode at a time of low light intensity such as nighttime, the quality of a detailed image 402 decreases. Accordingly, by transitioning to the night mode, the quality of the detailed image 402 improves. In the night mode, because near-infrared light in addition to visible light is incident on a solid-state image sensor 423 of the second imaging section 420, the sensitivity of the second imaging section 420 is higher than the sensitivity of the first imaging section 410.

Accordingly, in the image capturing apparatus 400 of the fourth embodiment, when in the night mode, a maximum charge accumulation time period that can be set to solid-state image sensors 413a through 413d in the first imaging section 410 is made longer than a maximum charge accumulation time period that can be set to the solid-state image sensor 423 in the second imaging section 420. By such a configuration, it is possible to improve the quality of a wide-angle image 401 which is generated from images obtained by the first imaging section 410 which has a relatively low sensitivity.

In this way, the image capturing apparatus 400 of the fourth embodiment has a configuration in which an infrared cut filter insertion/removal mechanism 426 is provided only for the second imaging section 420. By removing the infrared cut filter 425, the sensitivity of the second imaging section 420 is greater than the sensitivities of the plurality of imaging sections of the first imaging section 410. As a result, it is possible to miniaturize the plurality of imaging sections 411a through 411d of the first imaging section 410. As described above, the size of the image capturing apparatus 400 is mainly decided by the size of the first imaging section 410 which is configured from a plurality of imaging sections. Accordingly, more miniaturization of the image capturing apparatus as a whole is possible when miniaturizing the second imaging section 420 than when miniaturizing the plurality of imaging sections of the first imaging section 410.

Switching between whether to use the second imaging section 420 in the day mode or use the second imaging section 420 in the night mode may be determined by a light intensity of environmental light (intensity of a visible light component). The second imaging section 420 may have a light intensity sensor for measuring the light intensity of environmental light, and may estimate the light intensity from an image obtained by the image capturing apparatus 400.

Specifically, it is desirable to estimate the light intensity of environmental light by using a wide-angle image 401. When in the day mode, the second imaging section 420 inputs only visible light to the solid-state image sensor 423, and when in the night mode, the second imaging section 420 inputs both of visible light and infrared light to the solid-state image sensor 423. Accordingly, in a case of using the detailed image 402 to estimate the light intensity of environmental light, it is difficult to estimate the intensity of a visible light component when in the night mode, in particular. In contrast, the plurality of imaging sections 411a through 411d of the first imaging section 410 perform capturing with the infrared cut filters 415a through 415d inserted, independent of the light intensity of environmental light. Accordingly, by estimating the light intensity of environmental light using the wide-angle image 401, it is possible to more accurately estimate the intensity of a visible light component.

In other words, configuration may be such that, if the light intensity of environmental light obtained from the wide-angle image 401 is greater than or equal to a specific threshold value, the infrared cut filter for the second imaging section is inserted, and, if the light intensity of environmental light is less than the specific threshold value, the infrared cut filter of the second imaging section is removed.

In addition, configuration may be taken such that the plurality of imaging sections 411a through 411d of the first imaging section 410 use solid-state image sensors 413a through 413d that have pixels for visible light and pixels for near-infrared light, and do not have the infrared cut filters 415a through 415d. Specifically, configuration may be taken to use solid-state image sensors in which on-chip color filters of pixels of a part of an RGB Bayer arrangement are replaced with color filters that allow only near-infrared light to penetrate.

With such a configuration, and by having a configuration in which the infrared cut filter insertion/removal mechanism 426 is provided only for the second imaging section 420, it is possible to improve the quality of the wide-angle image 401 and the detailed image 402 at a time of low light intensity, while realizing miniaturization of the entirety of the image capturing apparatus 400.

Note that it is desirable that the second imaging section has a driving mechanism that can change a capturing direction, a zoom control mechanism that can change an image capturing angle, a focus control mechanism that can change a focus distance, and the like. With such a configuration, usage such as finding a monitoring target from a wide-angle image and using the second imaging section to track the monitoring target is possible.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-006684, filed Jan. 18, 2018, which is hereby incorporated by reference herein in its entirety.

What is claimed is:

1. An image capturing apparatus, comprising:
a first image capturing device having a plurality of imaging sections arranged so that parts of their image capturing ranges overlap each other, each imaging section having a solid-state image sensor;
a second image capturing device having a solid-state image sensor and configured to generate an image by capturing a part of an image capturing range of the first image capturing device with higher sensitivity than at least one of the plurality of imaging sections; and
at least one processor or circuit configured to function as the following units:
a combining process unit configured to generate a wide-angle image, by combining images captured for each frame period by the plurality of imaging sections;
a transfer unit configured to transfer the wide-angle image combined by the combining process unit to an external device; and
a control unit configured to perform control so that a charge accumulation time of the solid-state image sensor in the second image capturing device during one frame period is parallel to any of the charge accumulation times of the solid-state image sensors of the plurality of imaging sections in the first image device and the charge accumulation time of the solid-state image sensor in the second image capturing device during one frame period is shorter than any of the charge accumulation times of the solid-state image sensors of the plurality of imaging sections in the first image capturing device.

2. The image capturing apparatus according to claim 1, wherein the control unit controls charge accumulation time periods of the solid-state image sensors of the plurality of imaging sections in the first image capturing device to be less than or equal to a longer time period out of a time period incurred for the combining process and a time period incurred for the transfer process.

3. The image capturing apparatus according to claim 1, wherein the control unit controls the charge accumulation time periods of the solid-state image sensors of the plurality of imaging sections in the first image capturing device to be equal to a longer time period out of a time period incurred for the combining process and a time period incurred for the transfer process.

4. The image capturing apparatus according to claim 1, wherein sensitivities of the solid-state image sensors of the plurality of imaging sections in the first image capturing device are lower than a sensitivity of the solid-state image sensor in the second image capturing device.

5. The image capturing apparatus according to claim 1, wherein pixels of the solid-state image sensors of the plurality of imaging sections in the first image capturing device are smaller than pixels of the solid-state image sensor in the second image capturing device.

6. The image capturing apparatus according to claim 1, wherein a number of pixels of each solid-state image sensor of the plurality of imaging sections in the first image capturing device is greater than a number of pixels of the solid-state image sensor in the second image capturing device.

7. The image capturing apparatus according to claim 1, wherein the control unit controls the first image capturing device so that charge accumulation timings differ between the solid-state image sensors of the plurality of imaging sections in the first image capturing device.

8. The image capturing apparatus according to claim 1, wherein the transfer unit further transfers the image generated by the second image capturing device to n the external device, and, in the transfer device, a time period for transferring the wide-angle image is longer than a time period for transferring the image generated by the second image capturing device.

9. The image capturing apparatus according to claim 1, wherein the control unit uses information obtained from the wide-angle image to cause the maximum charge accumulation time period that can be set to the solid-state image sensors of the plurality of imaging sections in the first image capturing device to vary for each frame.

10. The image capturing apparatus according to claim 1, wherein the second image capturing device has an aperture and the plurality of imaging sections in the first image capturing device do not have an aperture.

11. The image capturing apparatus according to claim 1, wherein the plurality of imaging sections in the first image capturing device have infrared cut filters, and the second image capturing device has an infrared cut filter and an insertion/removal mechanism for insertion/removal of the infrared cut filter into/out of a light path.

12. The image capturing apparatus according to claim 11, wherein if a light intensity of environmental light obtained from the wide-angle image is greater than or equal to a specific threshold value, the insertion/removal mechanism inserts the infrared cut filter of the second image capturing device into the light path, and if the light intensity of environmental light obtained from the wide-angle image is less than the specific threshold value, the insertion/removal mechanism removes the infrared cut filter of the second image capturing device from the light path.

13. The image capturing apparatus according to claim 1, wherein the solid-state image sensors of the plurality of imaging sections in the first image capturing device have pixels for visible light and pixels for near-infrared light, and the second image capturing device has an infrared cut filter and an insertion/removal mechanism for insertion/removal of the infrared cut filter into/out of a light path.

14. The image capturing apparatus according to claim 1, wherein the control unit controls the charge accumulation time of the solid-state imaging device in the second imaging device in one frame period to be shorter than any charge accumulation time of the solid-state imaging devices in the plurality of imaging sections in the first imaging device.

15. A method of controlling an image capturing apparatus provided with a first image capturing device having a plurality of imaging sections arranged so that parts of their image capturing ranges overlap each other, each imaging section having a solid-state image sensor, and a second image capturing device having a solid-state image sensor and configured to generate an image by capturing a part of an image capturing range of the first image capturing device with higher sensitivity than at least one of the plurality of imaging sections, the method comprising:
generating a wide-angle image by combining images captured for each frame period by the plurality of imaging sections;
transferring the wide-angle image combined by the combining to an external device; and
controlling so that the charge accumulation time of the solid-state image sensor in the second image capturing device during one frame period is parallel to any of the charge accumulation times of the solid-state image sensors of the plurality of imaging sections in the first image device and the charge accumulation time of the solid-state image sensor in the second image capturing device during one frame period is shorter than any of the charge accumulation times of the solid-state image sensors of the plurality of imaging sections in the first image capturing device.

16. A non-transitory computer-readable storage medium storing a program for causing a computer to execute a method of controlling an image capturing apparatus provided with a first image capturing device having a plurality of imaging sections arranged so that parts of their image capturing ranges overlap each other, and each imaging section having a solid-state image sensor, and a second image capturing device having a solid-state image sensor and configured to generate an image by capturing a part of an image capturing range of the first image capturing device with higher sensitivity than at least one of the plurality of imaging sections, the method comprising:

generating a wide-angle image by combining images captured for each frame period by the plurality of imaging sections;

transferring the wide-angle image combined by the combining to an external device; and controlling the charge accumulation time of the solid-state image sensor in the second image capturing device during one frame period is parallel to any of the charge accumulation times of the solid-state image sensors of the plurality of imaging sections in the first image device and the charge accumulation time of the solid-state image sensor in the second image capturing device during one frame period is shorter than any of the charge accumulation times of the solid-state image sensors of the plurality of imaging sections in the first image capturing device.

* * * * *